(12) United States Patent
Kwon (10) Patent No.: US 10,543,800 B2
(45) Date of Patent: Jan. 28, 2020

(54) SIDE AIRBAG DEVICE FOR A VEHICLE

(71) Applicants: HYUNDAI MOTOR COMPANY, Seoul (KR); KIA MOTORS CORPORATION, Seoul (KR)

(72) Inventor: Hyock In Kwon, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 158 days.

(21) Appl. No.: 15/818,284

(22) Filed: Nov. 20, 2017

(65) Prior Publication Data
US 2019/0061675 A1 Feb. 28, 2019

(30) Foreign Application Priority Data

Aug. 24, 2017 (KR) ......................... 10-2017-0107331

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/233* (2013.01);
(Continued)

(58) Field of Classification Search
CPC .......... B60R 21/23138; B60R 21/2338; B60R 21/207; B60R 21/233; B60R 21/261;
(Continued)

(56) References Cited

U.S. PATENT DOCUMENTS 5,636,862 A * 6/1997 Cheung ................. B60R 21/207
280/730.2
5,730,464 A 3/1998 Hill
(Continued)

FOREIGN PATENT DOCUMENTS

DE G9405143 5/1994
JP 2006008105 1/2006
(Continued)

OTHER PUBLICATIONS

Non-Final Office Action in U.S. Appl. No. 15/827,025, dated Jul. 10, 2019, 36 pages.

*Primary Examiner* — Paul N Dickson
*Assistant Examiner* — Joselynn Y Sliteris
(74) *Attorney, Agent, or Firm* — Lempia Summerfield Katz LLC (57) ABSTRACT

A side airbag device for a vehicle includes a lower chamber and an upper chamber to protect a passenger from a side impact in the event of a vehicle collision. The upper chamber is bent towards the passenger by a connecting tether to support a passenger's neck region and prevent the neck from being twisted. The restraint belt forms an inserting space in front of a passenger when the upper chamber is bent so that a passenger's shoulder region is inserted into the inserting space when the passenger is moved forwards by collision inertia. The passenger's shoulder region is surrounded and supported by the restraint belt so that the passenger's body is restrained by a seat. A passenger is protected from impact and simultaneously the passenger is restrained by the seat to minimize an injury.

9 Claims, 8 Drawing Sheets

(51) Int. Cl.
  *B60R 21/233*   (2006.01)
  *B60R 21/2338*  (2011.01)
  *B60R 21/261*   (2011.01)
  *B60R 21/00*    (2006.01)

(52) U.S. Cl.
  CPC ........ *B60R 21/2338* (2013.01); *B60R 21/261*
    (2013.01); *B60R 2021/0006* (2013.01); *B60R*
    *2021/0048* (2013.01); *B60R 2021/0058*
    (2013.01); *B60R 2021/23146* (2013.01); *B60R*
    *2021/23386* (2013.01); *B60R 2021/2615*
    (2013.01)

(58) Field of Classification Search
  CPC .. B60R 2021/0058; B60R 2021/23146; B60R
    2021/23386; B60R 2021/2615; B60R
    2021/0006; B60R 2021/0048
  See application file for complete search history.

(56) References Cited

U.S. PATENT DOCUMENTS

| | | | |
|---|---|---|---|
| 6,959,945 | B2 | 11/2005 | Fischer et al. |
| 8,342,570 | B2 | 1/2013 | Higuchi |
| 8,360,469 | B2 | 1/2013 | Wiik et al. |
| 8,414,018 | B2 | 4/2013 | Choi et al. |
| 8,480,125 | B1 | 7/2013 | Belwafa et al. |
| 8,480,128 | B2 | 7/2013 | Fukawatase et al. |
| 8,632,094 | B2 | 1/2014 | Schmidt |
| 8,684,408 | B2* | 4/2014 | Thomas ............... B60R 21/231 280/730.2 |
| 8,690,187 | B2 | 4/2014 | Fukawatase |
| 9,016,718 | B2 | 4/2015 | Fukawatase et al. |
| 9,180,833 | B2 | 11/2015 | Jo |
| 9,227,590 | B2 | 1/2016 | Fujiwara |
| 9,266,494 | B2 | 2/2016 | Wang |
| 9,505,374 | B2 | 11/2016 | Matsuzaki et al. |
| 9,533,648 | B2 | 1/2017 | Fujiwara |
| 9,592,788 | B2* | 3/2017 | Wiik ............... B60R 21/23138 |
| 9,598,044 | B2 | 3/2017 | Fujiwara |
| 9,771,046 | B2* | 9/2017 | Lee ............... B60R 21/232 |
| 9,809,189 | B2 | 11/2017 | Grell |
| 9,994,181 | B1 | 6/2018 | Dubaisi |
| 10,023,147 | B2* | 7/2018 | Kwon ............... B60R 21/207 |
| 10,189,432 | B2 | 1/2019 | Matsushita |
| 10,259,420 | B2* | 4/2019 | Thomas ............... B60R 21/231 |
| 10,336,283 | B2 | 7/2019 | Rickenbach |
| 2004/0051285 | A1 | 3/2004 | Fischer |
| 2006/0131847 | A1 | 6/2006 | Sato |
| 2007/0108753 | A1 | 5/2007 | Pang et al. |
| 2009/0224520 | A1 | 9/2009 | Higuchi |
| 2011/0193329 | A1 | 8/2011 | Higuchi |
| 2012/0025499 | A1 | 2/2012 | Shibayama et al. |
| 2012/0049498 | A1 | 3/2012 | Wiik et al. |
| 2012/0091697 | A1 | 4/2012 | Wiik et al. |
| 2012/0119475 | A1 | 5/2012 | Choi et al. |
| 2013/0076014 | A1 | 3/2013 | Thomas |
| 2014/0035264 | A1 | 2/2014 | Fukushima et al. |
| 2014/0062069 | A1 | 3/2014 | Fukawatase |
| 2014/0097601 | A1 | 4/2014 | Fukawatase |
| 2014/0151984 | A1 | 6/2014 | Fukawatase et al. |
| 2014/0284906 | A1 | 9/2014 | Akiyama |
| 2014/0333051 | A1 | 11/2014 | Jo |
| 2015/0076803 | A1 | 3/2015 | Fujiwara |
| 2015/0217714 | A1 | 8/2015 | Fujiwara |
| 2015/0274111 | A1 | 10/2015 | Ishida |
| 2015/0314748 | A1 | 11/2015 | Mihm |
| 2016/0107602 | A1 | 4/2016 | Nakashima |
| 2016/0114755 | A1 | 4/2016 | Matsuzaki et al. |
| 2016/0114757 | A1 | 4/2016 | Fujiwara |
| 2016/0159306 | A1 | 6/2016 | Fujiwara |
| 2016/0167616 | A1 | 6/2016 | Wiik |
| 2016/0200278 | A1 | 7/2016 | Wiik et al. |
| 2016/0229369 | A1 | 8/2016 | Thomas |
| 2017/0129444 | A1 | 5/2017 | Fukawatase et al. |
| 2017/0174174 | A1 | 6/2017 | Ohno et al. |
| 2017/0182963 | A1 | 6/2017 | Hiraiwa et al. |
| 2017/0182969 | A1 | 6/2017 | Fujiwara |
| 2017/0334386 | A1 | 11/2017 | Park |
| 2018/0118150 | A1 | 5/2018 | Kwon |
| 2018/0126944 | A1 | 5/2018 | Choi |
| 2018/0290619 | A1 | 10/2018 | Kitagawa |
| 2018/0326938 | A1 | 11/2018 | Rickenbach |
| 2019/0016293 | A1 | 1/2019 | Saso |
| 2019/0047504 | A1 | 2/2019 | Sugishima |
| 2019/0054890 | A1* | 2/2019 | Kwon ............... B60R 21/23138 |
| 2019/0061675 | A1 | 2/2019 | Kwon |
| 2019/0061676 | A1* | 2/2019 | Kwon ............... B60R 21/233 |
| 2019/0092271 | A1* | 3/2019 | Park ............... B60R 21/207 |
| 2019/0152421 | A1* | 5/2019 | Byun ............... B60R 21/2334 |
| 2019/0161053 | A1 | 5/2019 | Gwon |

FOREIGN PATENT DOCUMENTS

| | | |
|---|---|---|
| JP | 4165239 | 10/2008 |
| JP | 2009137441 | 6/2009 |
| JP | 2009234562 | 10/2009 |
| JP | 2010083414 | 4/2010 |
| JP | 2011240807 A | 12/2011 |
| JP | 2012051557 | 3/2012 |
| JP | 2014051138 | 3/2014 |
| JP | 5594340 | 9/2014 |
| JP | 5754436 | 7/2015 |
| JP | 2016083955 | 5/2016 |
| JP | 2016107721 | 6/2016 |
| JP | 2016203945 | 12/2016 |
| KR | 20080101478 | 11/2008 |
| KR | 20120051279 | 5/2012 |
| KR | 101262977 | 5/2013 |
| KR | 101292323 | 7/2013 |
| KR | 20140132188 | 11/2014 |
| KR | 20150001100 | 1/2015 |
| KR | 101637205 | 7/2016 |
| KR | 1020170067962 | 6/2017 |
| WO | 2014033820 | 3/2014 |
| WO | 2017014421 | 1/2017 |

* cited by examiner

SIDE AIRBAG DEVICE FOR A VEHICLE

CROSS REFERENCE TO RELATED APPLICATION

The present application claims priority of Korean Patent Application No. 10-2017-0107331 filed on Aug. 24, 2017, the entire contents of which is incorporated herein for all purposes by this reference.

BACKGROUND

Field of the Disclosure

The present disclosure relates to a side airbag device for a vehicle. Particularly, the disclosure relates to a side airbag device for a vehicle, which protects a passenger from impact in the event of a vehicle collision and restrains a passenger's movement to minimize a passenger's injury.

Description of the Related Art

Technology for a vehicle is being developed to ensure the safety of passengers and to improve driving performance, convenience, and functionality.

Among a variety of safety devices applied to the vehicle, an airbag is applied as the most efficient means for protecting a passenger from impact.

Such an airbag is a means for protecting a driver and a passenger in the event of a vehicle collision. An airbag includes a collision sensor that detects a vehicle collision, a controller that operates the airbag based on the detected result of the collision sensor, and an airbag module that actuates the airbag in response to a signal of the controller. The airbag is classified as a driver's seat airbag, a passenger's seat airbag, a side airbag, a roof airbag, and the like, depending on an installed position in the vehicle or a target to be protected.

In the event of a side collision, upper bodies of passengers sitting in the driver's seat and the passenger's seat are moved. The passengers sitting in the driver's seat and the passenger's seat may collide with each other or with an armrest, a seat, or the like, so that the passengers may be injured.

In addition, the passenger's body is excessively moved forwards when the passenger does not wear a safety belt. Thereby, the passenger is subjected to a large impact even if the front airbag is deployed. Furthermore, the passenger's body is rotated by inertia even if the passenger wears the safety belt, so that the body may be twisted and joints may be injured.

The foregoing is intended merely to aid in the understanding of the background of the present disclosure. The foregoing is not intended to mean that the present disclosure falls within the purview of the related art that is already known to those having ordinary skill in the art.

SUMMARY

Accordingly, the present disclosure is made keeping in mind the above problems occurring in the related art. The present disclosure is intended to propose a side airbag device for a vehicle. The side airbag device safely protects a passenger from side impact in the event of a vehicle collision by simultaneously restraining a passenger on a seat.

According to one embodiment, a side airbag device is provided for a vehicle. The airbag device includes a cushion. The cushion includes a lower chamber provided on a side of a seat and disposed on a side of a passenger's body when the lower chamber is inflated by gas supplied from an inflator. and the cushion also includes an upper chamber extending upwards from the lower chamber and disposed on a side of a passenger's head. The airbag device includes a connecting tether provided to be connected to the upper chamber and a seat frame. The connecting tether pulls the upper chamber when the cushion is inflated, thus causing the upper chamber to be bent towards the passenger's head. The airbag device also includes a restraint belt provided to be connected to the upper chamber and the connecting tether and defines an inserting space in conjunction with the cushion if the upper chamber is bent by the connecting tether when the cushion is inflated. When the passenger's body is moved forwards in the event of a vehicle collision, a shoulder region of the passenger is inserted into the inserting space between the cushion and the restraint belt to restrain a forward movement of the passenger.

The connecting tether may be connected at a first end thereof to a front end of the upper chamber and may be connected at a second end thereof to the seat frame.

The restraint belt may be connected at a first end thereof to an upper end of the upper chamber and may be connected at a second end thereof to an upper end or a middle portion of the connecting tether.

The restraint belt may be formed in a rectangular shape. The restraint belt may be connected at an upper end thereof to the upper end of the upper chamber and connected at a lower end thereof to the middle portion of the connecting tether. The restraint belt may be formed such that a front end thereof is shorter in length than a rear end thereof.

The first end of the connecting tether may be secured to the seat frame on a passenger side with respect to the cushion and the second end of the connecting tether may extend in a direction opposite to the passenger. The connecting tether may surround the upper chamber and extend to the passenger side to be secured to the seat frame.

A through hole may be formed through each of the front end and a central portion of the upper chamber so that the connecting tether may pass therethrough. The connecting tether may extend through the through hole in the direction opposite to the passenger in a state where first and second ends of the connecting tether may be secured to the seat frame. The connecting tether may be connected to surround the upper chamber.

The restraint belt may be connected to communicate with the upper chamber to be supplied with the gas of the inflator from the upper chamber. The restraint belt may be inflated by the gas supplied through the upper chamber.

A communication hole may be formed in a portion of the upper chamber to which the restraint belt may be connected. The restraint belt may include a shield that may cover and close the communication hole. The restraint belt may include a wire connected at a first end thereof to the shield and connected at a second end thereof to an inner end of the restraint belt. As the restraint belt may be deformed when the cushion may be inflated, the wire may be pulled so that the communication hole, closed by the shield, may be opened.

As described above, the side airbag device for the vehicle is configured such that the lower chamber and the upper chamber protect a passenger from side impact in the event of a vehicle collision. The upper chamber is bent towards the passenger by the connecting tether to support the passenger's neck region and prevent his or her neck from being twisted.

Furthermore, the restraint belt forms the inserting space in front of a passenger when the upper chamber is bent, so that the passenger's shoulder region is inserted into the inserting space when the passenger is moved forwards by collision inertia. The passenger's shoulder region is surrounded and supported by the restraint belt, so that his or her body is restrained by the seat. A passenger is protected from impact and simultaneously his or her body is restrained by the seat to minimize an injury.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Hereinbelow, embodiments of the present disclosure are described in detail with reference to the accompanying drawings.

Figure 1:
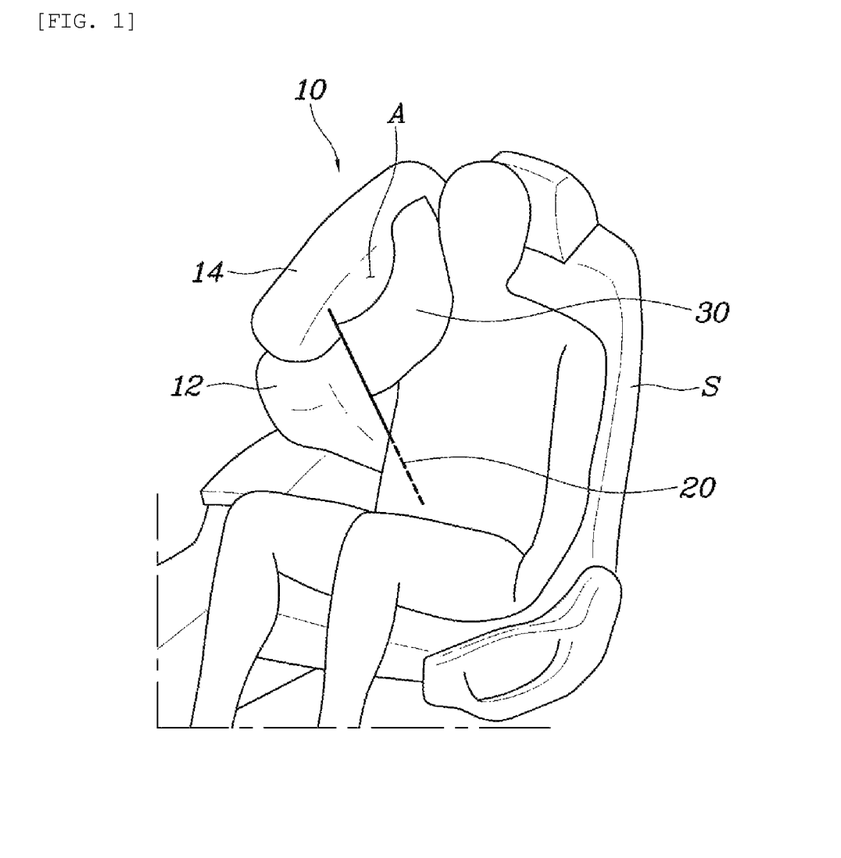
FIG. 1 is a diagram illustrating a side airbag device for a vehicle according to an embodiment of the present disclosure.

FIG. 1 is a diagram illustrating a side airbag device for a vehicle according to an embodiment of the present disclosure. FIGS. 2-8 are diagrams illustrating the side airbag device for the vehicle of FIG. 1.

Figure 2:
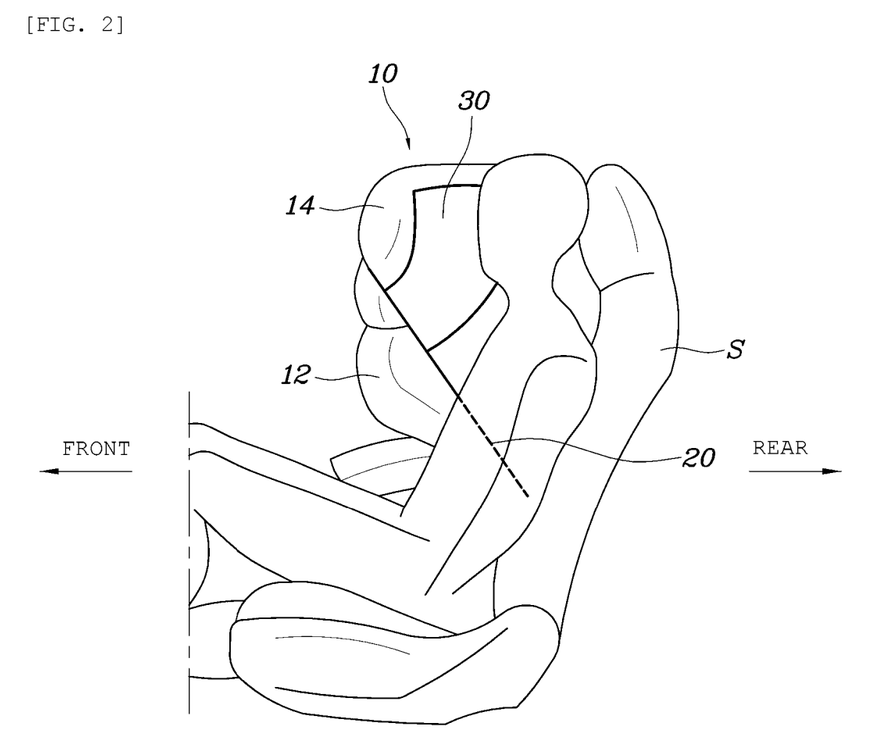
FIGS. 2-8 are diagrams illustrating the side airbag device for the vehicle of FIG. 1.
Figure 3:
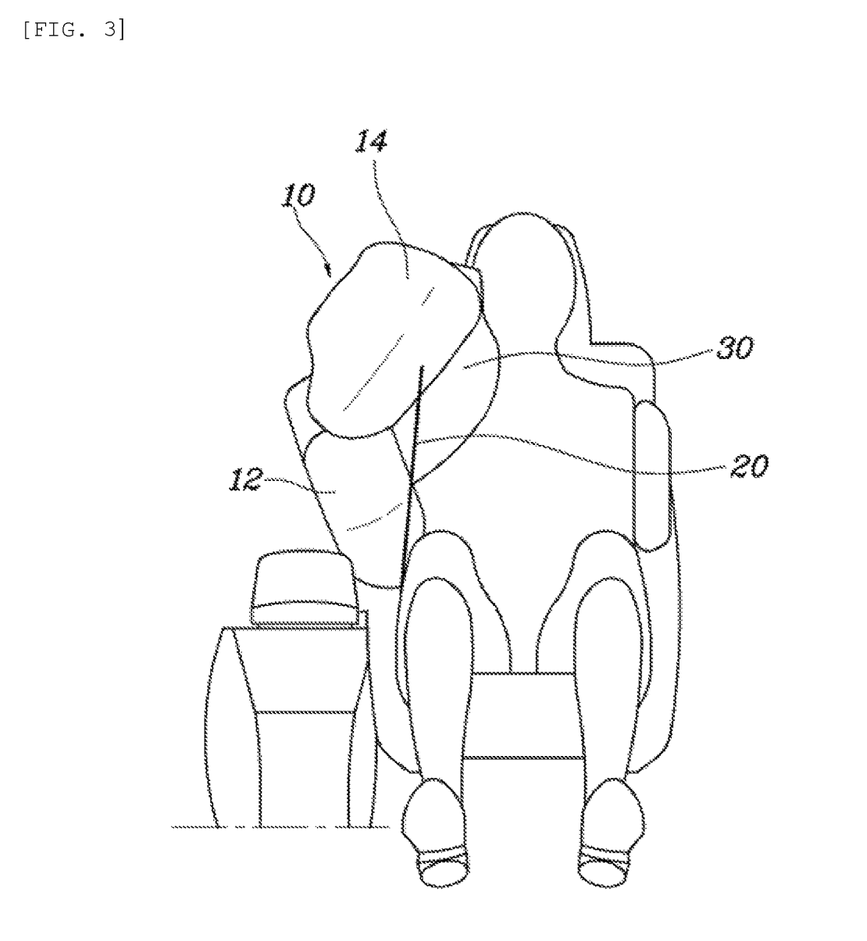

As illustrated in FIGS. 1-3, the side airbag device for the vehicle according to the present disclosure includes a cushion 10 having a lower chamber 12, an upper chamber 14, a connecting tether 20, and a restraint belt 30. The lower chamber 12 is provided on a side of a seat and is disposed on a side of a passenger's body when the lower chamber 12 is inflated by gas supplied from an inflator. The upper chamber 14 extends upwards from the lower chamber 12 and is disposed on a side of a passenger's head. The connecting tether 20 is provided to be connected to the upper chamber 14 and a seat frame S. The connecting tether 20 pulls the upper chamber 14 when the cushion 10 is inflated, thus causing the upper chamber 14 to be bent towards the passenger's head. The restraint belt 30 is provided to be connected to the upper chamber 14 and the connecting tether 20. The restraint belt 30 defines an inserting space A in conjunction with the cushion 10, if the upper chamber 14 is bent by the connecting tether 20 when the cushion 10 is inflated. When the passenger's body is moved forwards in the event of a vehicle collision, a shoulder region of the passenger is inserted into the inserting space A between the cushion 10 and the restraint belt 30 to restrain a forward movement of the passenger.

The side airbag device of the present disclosure is intended to protect a passenger from impact in the event of a vehicle collision and simultaneously prevent a passenger's neck from being twisted by collision inertia by restraining a passenger's body on the seat.

To this end, the cushion 10 of the present disclosure includes the lower chamber 12, which is disposed on the side of the passenger's body when being inflated, and the upper chamber 14, which extends upwards from the lower chamber 12 and is disposed on the side of the passenger's head. Such a cushion 10 is provided on the side of the seat to be deployed towards a neighboring seat. By way of example, as the cushion 10 is deployed between a driver's seat and a passenger seat, the upper chamber 14 may protect one from colliding with a passenger sitting in the passenger seat, while the lower chamber 12 may protect a passenger's body from colliding with an armrest.

In this regard, the connecting tether 20 secured to the seat frame S is connected to the upper chamber 14 of the cushion 10. When the cushion 10 is inflated, the upper chamber 14 is pulled downwards by the connecting tether 20 secured to the seat frame S to be bent towards the passenger's head. If the upper chamber is bent towards the passenger's head, the upper chamber supports the passenger's head to prevent the passenger's neck from being twisted by collision inertia.

According to the present disclosure, the restraint belt 30 connects the upper chamber 14 with the connecting tether 20. If the upper chamber 14 is bent as the cushion 10 is inflated, the restraint belt 30 forms the inserting space A in conjunction with the cushion 10. As a passenger's shoulder region moves forwards by collision inertia, the shoulder region is inserted into the inserting space A. The restraint belt restrains the passenger's body from moving forwards.

In other words, as the upper chamber 14 is pulled towards the passenger's head by the connecting tether 20 when the cushion 10 is inflated, the restraint belt 30, connected to the upper chamber 14 and the connecting tether 20, is disposed in front of the passenger's body. When the passenger's body is moved forwards by collision inertia, the passenger's body is restrained by the restraint belt 30 to limit a forward movement and stably restrain the passenger on the seat.

As such, according to the present disclosure, both the lower chamber 12 and the upper chamber 14 protect the passenger from side impact in the event of a vehicle collision. The upper chamber 14 is bent towards the passenger's head by the connecting tether 20 to support the passenger's neck region and prevent the neck from being twisted.

In addition, when the upper chamber 14 is bent, the restraint belt 30 forms the inserting space A in front of the passenger. When the passenger's body is moved forwards by collision inertia, the passenger's shoulder region is inserted into the inserting space A and is surrounded and supported by the restraint belt 30, so that the passenger's body is restrained by the seat.

Hereinafter, various embodiments of the present disclosure are described in detail.

As illustrated in FIGS. 1-3, the connecting tether 20 may be connected at one end thereof to a front end of the upper chamber 14. The connecting tether 20 may be connected at the other end thereof to the seat frame S.

As such, since one end of the connecting tether 20 is connected to the front end of the upper chamber 14, the upper chamber 14 is pulled and bent downwards by the connecting tether 20 when the cushion 10 is inflated. Furthermore, as the front end of the upper chamber 14 is pulled rearwards, the upper chamber 14 surrounds the passenger's head. Thereby, when the passenger's head is moved laterally or forwards by inertia, the upper chamber 14 is bent by the connecting tether 20 to support the passenger's head. Simultaneously, as the front end of the upper chamber 14 is bent to surround the passenger's head, the passenger's head is stably supported.

Meanwhile, the restraint belt 30 may be connected at one end thereof to an upper end of the upper chamber 14. The restraint belt 30 may be connected at the other end thereof to an upper end or a middle portion of the connecting tether 20.

According to the present disclosure, the restraint belt 30 is positioned in front of the passenger's shoulder when the cushion 10 is inflated. As illustrated in FIG. 2, the restraint belt 30 is connected at one end thereof to the upper end of the upper chamber 14 and is connected at the other end thereof to the upper end or the middle portion of the connecting tether 20. This allows the restraint belt 30 to be located in front of the passenger's shoulder in the state where the upper chamber 14 is bent downwards by the connecting tether 20. The other end of the restraint belt 30 may be connected to the lower end of the connecting tether 20. However, in this case, the other end of the connecting tether 20 is connected to the seat frame S. The restraint belt 30 is placed at a rear position, so that it would not be possible to smoothly restrain the passenger's body and thereby prevent the body from being moved forwards. For this reason, the restraint belt 30 is connected at one end thereof to the upper end of the upper chamber 14 and is connected at the other end thereof to the upper end or the middle portion of the connecting tether 20, so that the restraint belt 30 is located in front of the passenger's shoulder when the cushion 10 is inflated.

Figure 4:
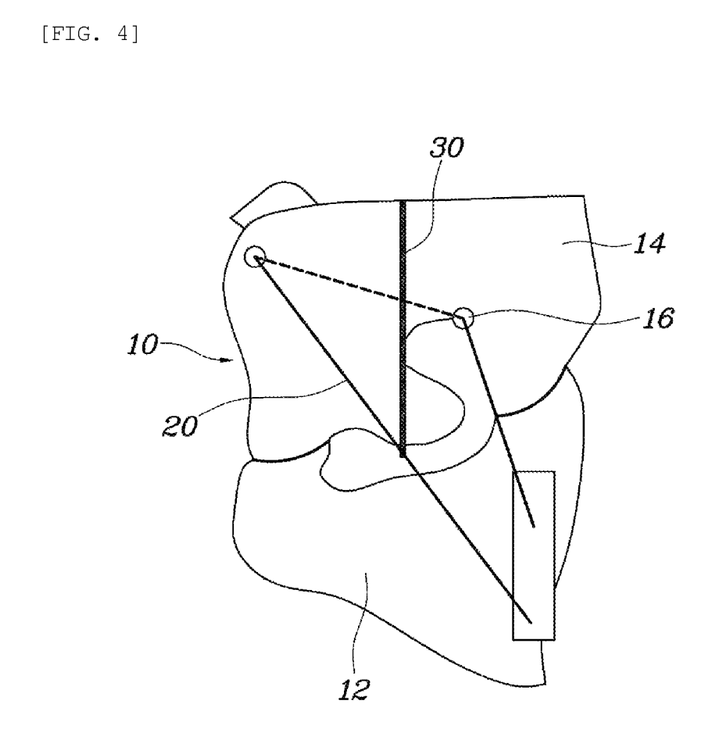
Figure 5:
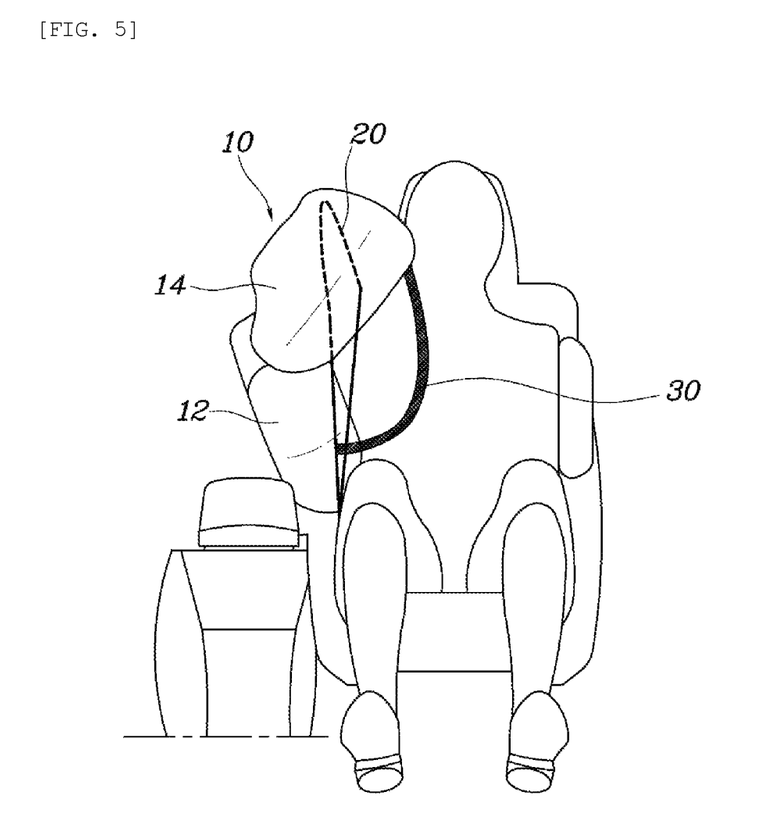

Meanwhile, another embodiment of the connecting tether 20 for bending the upper chamber 14 when the cushion 10 is inflated is illustrated in FIGS. 4 and 5. One end of the connecting tether 20 is secured to the seat frame S on the passenger side with respect to the cushion 10. The other end of the connecting tether 20 extends in a direction opposite to the passenger to surround the upper chamber 14 and extends towards the passenger to be secured to the seat frame S.

In other words, the connecting tether 20 is located on the passenger side with respect to the cushion 10. In the state where one end thereof is secured to the seat frame S, the connecting tether extends in the direction opposite to the passenger to surround the upper chamber 14. The connecting tether surrounds the upper chamber 14 and extends towards the passenger side, so that the other end is secured to the seat frame S. As illustrated in FIG. 5, as the connecting tether 20 is coupled to surround the upper chamber 14, the operation of pulling the upper chamber 14 may be smoothly performed when the cushion 10 is inflated.

In the state where such a connecting tether 20 is connected to the seat frame S, the connecting tether extends to surround the upper chamber 14, so that tension is maintained in the connecting tether 20 when the cushion 10 is inflated. If the passenger's body presses the connecting tether 20 by a side collision, the connecting tether 20 may pull the upper chamber 14. As such, as the upper chamber 14, pulled by the connecting tether 20, is bent towards the passenger's head, the upper chamber comes into contact with the passenger's head and thereby stably supports the passenger's head.

In detail, as illustrated in FIG. 4, a through hole 16 is formed through each of the front end and a central portion of the upper chamber 14, so that the connecting tether 20 passes therethrough. The connecting tether 20 extends through the through hole 16 in the direction opposite to the passenger in a state where one and the other ends of the connecting tether 20 are secured to the seat frame S. The connecting tether 20 is connected to surround the upper chamber 14.

The through hole 16 is formed through each of the front end and the central portion of the upper chamber 14. In the state where one end of the connecting tether 20 is secured to the seat frame S, the other end passes through the through hole 16 formed in the central portion of the upper chamber 14 and extends in the direction opposite to the passenger. Thereafter, the connecting tether extends through the through hole 16 formed in the front end of the upper chamber 14 to the passenger side and is secured to the seat frame S. When the cushion 10 is inflated, the upper chamber 14 is pulled by the connecting tether 20 to be bent. As the front end of the upper chamber 14 is bent, the upper chamber 14 may surround the passenger's head. Therefore, the upper chamber 14 may protect the passenger's head from impact and simultaneously prevent the passenger's neck from being twisted.

Meanwhile, the restraint belt 30 is formed in a rectangular shape. The restraint belt 30 is connected at an upper end thereof to the upper end of the upper chamber 14 and connected at a lower end thereof to the middle portion of the connecting tether 20. The restraint belt 30 is formed such that a front end thereof is shorter in length than a rear end thereof.

Since the restraint belt 30 is formed in the rectangular shape, the restraint belt 30 may widely surround the passenger's shoulder and thereby may more smoothly restrain a forward movement as a contact area between the restraint belt 30 and the passenger is obtained when the cushion 10 is inflated and the passenger comes into contact with the restraint belt 30. Furthermore, since the restraint belt 30 is connected at the upper end thereof to the upper end of the upper chamber 14 and is connected at the lower end thereof to the middle portion of the connecting tether 20, the restraint belt 30 may be located to correspond to the passenger's shoulder in the state where the cushion 10 is inflated and the upper chamber 14 is bent downwards by the connecting tether 20.

Furthermore, since the restraint belt 30 is formed such that the front end thereof is shorter in length than the rear end thereof, a sufficient length of the rear end of the restraint belt 30 coming into contact with the passenger's shoulder is obtained, so that the restraint belt 30 may stably surround and support the passenger's shoulder. In addition, as the connecting tether 20 is connected at one end thereof to the front end of the upper chamber 14 and connected at the other end to the seat frame S, the restraint belt 30 is formed such that the length of the front end is short and the length of the rear end is long to guarantee a structurally stable connection.

Figure 6:
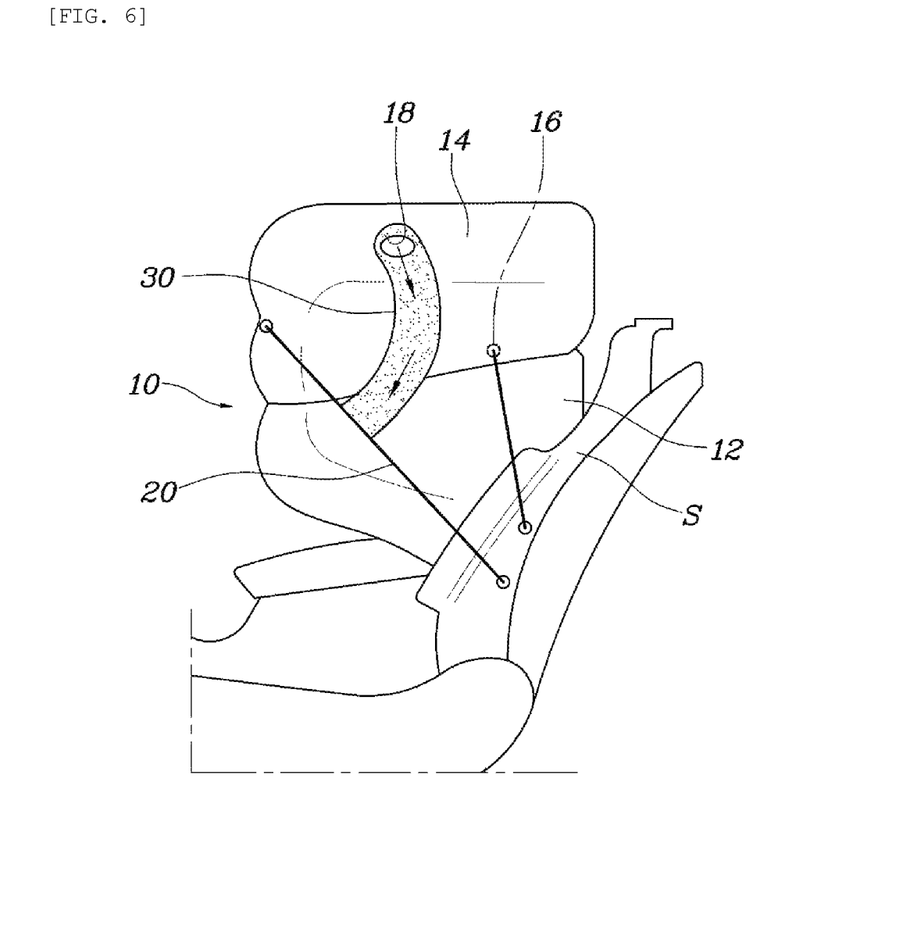

As illustrated in FIG. 6, the restraint belt 30 is connected to communicate with the upper chamber to be supplied with the gas of the inflator from the upper chamber 14 and is inflated by the gas supplied through the upper chamber 14.

That is, the restraint belt 30 has an internal space and is configured to be inflated when gas is injected. As the restraint belt is inflated by gas supplied to the upper chamber 14, a restraining force for restraining the passenger's body is obtained. In addition, as the restraint belt 30 is inflated, impact caused by the contact of the passenger with the restraint belt 30 is also reduced to minimize the passenger's injury.

Figure 7:
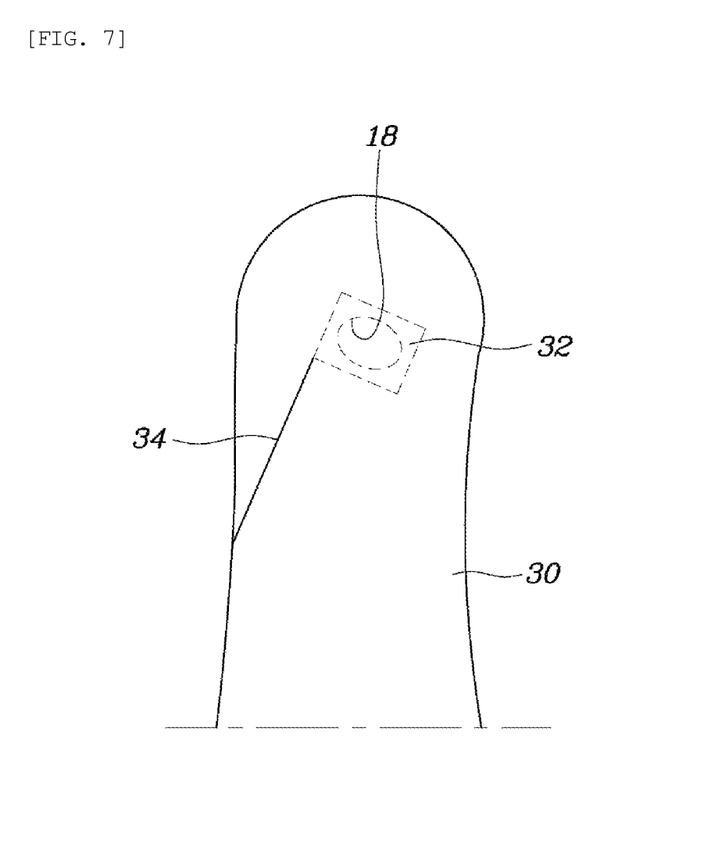

As illustrated in FIG. 7, a communication hole 18 is formed in a portion of the upper chamber 14 to which the restraint belt 30 is connected. The restraint belt 30 includes a shield 32 that covers and closes the communication hole 18. A wire 34 is connected at one end thereof to the shield 32 and connected at the other end thereof to an inner end of the restraint belt 30. Thereby, as the restraint belt 30 is deformed when the cushion 10 is inflated, the wire 34 is pulled, so that the communication hole 18, closed by the shield 32, is opened. In the state where the shield 32 is disposed to cover the communication hole 18, the shield is temporarily secured by sewing.

As such, the restraint belt 30 has the shield 32 that closes the communication hole 18 and the wire 34 that opens the shield 32 when the cushion 10 is deployed, so that the upper chamber 14 is sufficiently deployed when the cushion 10 is deployed and then the restraint belt 30 is inflated.

Figure 8:
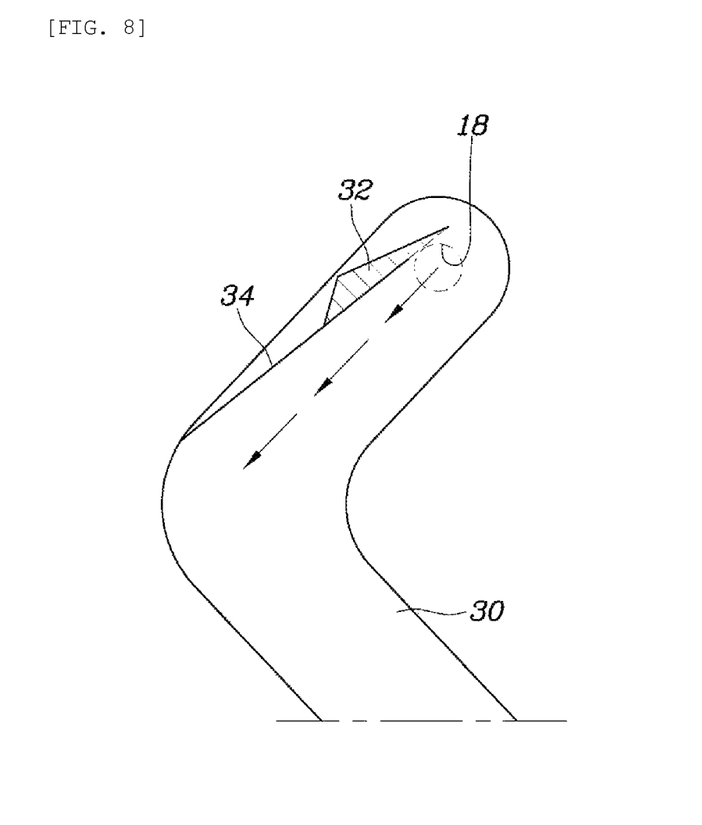

In detail, as illustrated in FIG. 7, the communication hole 18 is kept closed by the shield 32 in the non-inflated state of the cushion 10. Here, if the cushion 10 is inflated, volumes of the lower chamber 12 and the upper chamber 14 are increased. The restraint belt 30, connected to the connecting tether 20, is deformed as tension is generated in the connecting tether 20. In other words, as illustrated in FIG. 8, a pulling force acts on the wire 34 connected to the inner end of the restraint belt 30 by the deformation of the restraint belt 30. As the wire 34 is pulled, the shield 32 is pulled to open the communication hole 18. As gas in the upper chamber 14 flows through the communication hole 18 into the internal space of the restraint belt 30, the restraint belt 30 is inflated. The inflated restraint belt 30 more stably prevents the passenger from being moved forwards and absorbs impact caused by the contact of the passenger with the restraint belt 30.

As described above, the present disclosure provides a side airbag device for a vehicle in which the lower chamber 12 and the upper chamber 14 protect a passenger from side impact in the event of a vehicle collision. The upper chamber 14 is bent towards the passenger by the connecting tether 20 to support the passenger's neck region and prevent his or her neck from being twisted.

Furthermore, the restraint belt 30 forms the inserting space A in front of a passenger when the upper chamber 14 is bent. The passenger's shoulder region is inserted into the inserting space A when the passenger is moved forwards by collision inertia and then is surrounded and supported by the restraint belt 30, so that his or her body is restrained by the seat. A passenger is protected from impact and simultaneously his or her body is restrained by the seat to minimize an injury.

Although embodiments of the present disclosure have been described for illustrative purposes, those having ordinary skill in the art will appreciate that various modifications, additions, and substitutions are possible without departing from the scope and spirit of the disclosure as disclosed in the accompanying claims.

What is claimed is:

1. A side airbag device for a vehicle comprising:
    a cushion, the cushion including a lower chamber provided on a side of a seat and configured to be disposed on a side of a passenger's body when the lower chamber is inflated by gas supplied from an inflator, the cushion including an upper chamber extending upwards from the lower chamber and configured to be disposed on a side of a passenger's head;
    a connecting tether provided to be connected to the upper chamber and a seat frame, the connecting tether pulling the upper chamber when the cushion is inflated, thus causing the upper chamber configured to be bent towards the passenger's head; and
    a restraint belt provided to be connected to the upper chamber and the connecting tether, the restraint belt defining an inserting space in conjunction with the cushion if the upper chamber is bent by the connecting tether when the cushion is inflated,
    whereby, when the passenger's body is moved forwards in an event of a vehicle collision, configuring a shoulder region of the passenger to be inserted into the inserting space between the cushion and the restraint belt, thus configured to restrain a forward movement of the passenger.

2. The side airbag device according to claim 1, wherein the connecting tether is connected at a first end thereof to a front end of the upper chamber and is connected at a second end thereof to the seat frame.

3. The side airbag device according to claim 1, wherein the restraint belt is connected at a first end thereof to an upper end of the upper chamber and is connected at a second end thereof to an upper end or a middle portion of the connecting tether.

4. The side airbag device according to claim 1, wherein the restraint belt is connected at an upper end thereof to an upper end of the upper chamber, is connected at a lower end thereof to a middle portion of the connecting tether, and is formed such that a front end thereof is shorter in length than a rear end thereof.

5. The side airbag device according to claim 4, wherein the restraint belt is formed in a substantially rectangular shape.

6. The side airbag device according to claim 1, wherein a first end of the connecting tether is secured to the seat frame on a passenger side with respect to the cushion and a second end of the connecting tether extends in a direction opposite to the passenger, surrounds the upper chamber, and extends to the passenger side to be secured to the seat frame.

7. The side airbag device according to claim 6,
    wherein a through hole is formed through each of a front end and a central portion of the upper chamber so that the connecting tether passes therethrough, and
    wherein the connecting tether extends through the through holes in a direction opposite to the passenger in a state where the first end and the second end of the connecting tether are secured to the seat frame, and the connecting tether is connected to surround the upper chamber.

8. The side airbag device according to claim 1, wherein the restraint belt is connected to communicate with the upper chamber to be supplied with the gas of the inflator from the upper chamber, and the restraint belt is inflated by the gas supplied through the upper chamber.

9. The side airbag device according to claim 8,
    wherein a communication hole is formed in a portion of the upper chamber to which the restraint belt is connected, and
    wherein the restraint belt comprises a shield that covers and closes the communication hole and a wire connected at a first end thereof to the shield and connected at a second end thereof to an inner end of the restraint belt, whereby as the restraint belt is deformed when the cushion is inflated, the wire is pulled, so that the communication hole, closed by the shield, is opened.

* * * * *